United States Patent

[11] 3,616,023

| [72] | Inventors | Osamu Fukushima<br>Kurashiki;<br>Kazuo Nagoshi, Kurashiki; Tamon Kishida,<br>Itami, all of Japan |
|---|---|---|
| [21] | Appl. No. | 770,076 |
| [22] | Filed | Oct. 23, 1968 |
| [45] | Patented | Oct. 26, 1971 |
| [73] | Assignee | Kurashiki Rayon Co., Ltd.<br>Kurashiki, Japan |
| [32] | Priority | Nov. 4, 1967 |
| [33] | | Japan |
| [31] | | 44/71,070 |

[54] PROCESS FOR MANUFACTURING SUEDELIKE SHEET MATERIAL
11 Claims, No Drawings

[52] U.S. Cl. .................................... 156/254,
156/247, 161/406
[51] Int. Cl. ...................................... B32b 31/18

[50] Field of Search............................... 156/254, 247

[56] References Cited
UNITED STATES PATENTS

| 2,841,205 | 7/1958 | Bird..................... | 156/254 X |
| 3,174,887 | 3/1965 | Voelker................ | 156/254 X |
| 3,179,317 | 4/1965 | Voelker................ | 156/254 X |
| 3,240,855 | 3/1966 | Voelker................ | 156/254 X |

*Primary Examiner*—Reuben Epstein
*Attorney*—Stevens, Davis, Miller & Mosher

ABSTRACT: Suedelike sheet is manufactured by forming a coagulated polymer layer containing relatively large spongy spaces inside between two base materials and tearing the coagulated polymer layer into two layers at the center of the polymer layer by pulling both the base materials mutually in an opposite direction.

PROCESS FOR MANUFACTURING SUEDELIKE SHEET MATERIAL

This invention relates to a process for manufacturing a suedelike sheet material.

As a method for manufacturing a suedelike sheet material, the method which comprises the steps of coagulating a layer of polymer solution to form a polymer layer of large spongy structure and exposing the spongy structure in the polymer layer to the surface by abrading homogeneously the outer skin of the polymer layer, has been well known.

This conventional method, however, has various weak points; To obtain good appearance of the spongy structure exposed on the surface is difficult unless the surface of the polymer layer is abraded homogeneously with high accuracy, to abrade the surface with the accuracy of the order of ±0.01 mm. in order to obtain the homogeneous surface is difficult technically, and only one side of the surface can be used as the napped surface since the abraded outer skin of the sheet is converted into powder. Further, according to the method described above, when the outer skin is abraded by a sandpaper, the naps of surface are directed in accordance with the directions of the sandpaper to be shifted, and as a result, the appearance and the shade of color of the surface become different according to the direction of vision.

The difficult points described above are solved by this invention and the object of this invention is to provide a novel process for production of suedelike sheet material.

This invention comprises coagulating a layer a polymer solution by treating with a coagulating bath to form a polymer layer containing relatively large spongy spaces inside, preferably sticking and adhering well both sides of the polymer layer with porous base materials, and tearing in two at the center of the polymer layer.

There are the following methods as the processes of embodying the principal method described above;

1. A method comprises applying a layer of polymer solution to a porous base material, coagulating the polymer solution, sticking and adhering another porous base material to the surface of the polymer layer, and tearing in two at the center of the polymer layer by pulling both the base materials to an opposite direction.

2. A method comprises applying a layer of polymer solution to a porous base material, superimposing another porous base material on the layer of polymer solution, coagulating the polymer solution, drying it sufficiently and tearing in two at the center of the polymer layer by pulling the base materials to an opposite direction.

It is an excellent merit of this invention to obtain two suedelike sheet materials at the same time without any byproduct of powder produced by abrading.

According to this invention, it is particularly important to coagulate the polymer solution into such layer of spongy structure that the polymer layer can be torn off to two layers to form the sheets with napped surfaces.

The concentration of the polymer solution and the composition and the temperature of the coagulating bath are most important in order to coagulate the polymer solution to such structure.

Generally speaking, the lower the concentration of the polymer solution, the larger the spongy space is, however, it seems to be suitable to use the concentration of the polymer solution in a range from 10 to 50 weight percent. And it is recommended to select the optimum condition within this range.

As the coagulating bath for the polymer solution layer, use may be made of a material which is miscible at least partially with the solvent for the polymer, but which is not a solvent for the polymer, but it is preferable to use a mixture of a solvent for the polymer and a nonsolvent for the polymer in order to obtain a polymer layer with a desired structure.

Although the suitable composition of the mixture varies according to the kind of the polymer and the sort of the solvent and nonsolvent, when the polymer consists mainly of the elastomer of polyurethan, it is preferred that the content of the solvent in the coagulating bath is less than 50 percent. When coagulation is carried out in a coagulating bath having a higher concentration of the solvent for the polymer, the spongy structure of the polymer layer becomes very dense if lowering the temperature of the bath. As a result, it is very difficult to tear off the layer and the length of nap is very short. Therefore, the appearance and the feeling of the product thus obtained are almost the same as those which do not have any nap.

When the temperature of the coagulating bath is too high, the spongy structure obtained becomes very dense because the velocity of the coagulation of the polymer decreases. On the other hand, when the concentration of the solvent in the coagulating bath is low and the temperature of the bath is very low, the coagulating velocity at the surface is very rapid, while the velocity in the lower part of the layer is very slow, one cannot obtain a desired spongy structure and surface, since the velocity of diffusion is lowered by skinning of the surface and lowering the temperature and the surface is sometimes crumpled. Therefore, it is recommended to determine the temperature of the bath in accordance with the concentration of the solvent in the coagulating bath.

In the layer of the polymer after coagulation, there remains a large amount of the solvent. The product is usually washed with nonsolvent for the polymer to remove the solvent and then it is dried.

Any kind of polymer can be used as the polymer in this invention, but it is preferred to use mainly polyurethan elastomer, which has suitable pliability and excellent strength. Polyurethan elastomer can be used either alone or in admixture with other polyurethan. Mixtures of any kind of polyurethan and other polymer may also be used.

As the polymer which can be mixed with the polyurethan elastomer, any kinds of polymers which can be dissolved by the solvents of polyurethan elastomer, such as various kinds of vinyl polymers and copolymers such as polyvinyl chloride and polyacrylic ester, polyvinylidene chloride, poly-α-methyl styrene, polyamide, polyesteramide, polyester, polybutadiene and copolymer of butadiene and acrylonitrile, can be used.

Any kinds of solvent, in which the polyurethan elastomer can be dissolved, such as dimethyl formamide, dimethyl acetoamide, dimethyl sulfoxide, tetrahydrofuran, dioxane and γ-butylolacetone can be used as the solvents for the polymer. These solvents can be used either alone or in admixture. Further, nonsolvent may be added to the solvent to such an extent that the dissolution of the polymer is not inhibited.

The nonsolvent for the polymer should be at least partially miscible with the solvent for the polymer. Water, alcohols such as methyl alcohol, ethyl alcohol and ethylene glycol, ethyl acetate, benzene, toluene and others can be used as the useful nonsolvent. However, water is especially useful as the coagulating bath.

Coloring materials such as pigments and dyestuffs, fillers and plasticizers can be added in the polymer solution. Especially, it is preferable in view of formation of the desired spongy structure to add to the polymer solution a substance having a poor affinity to the coagulating bath, which effects a mutual diffusion with the solvent for the polymer in the coagulation process of the polymer solution to promote the coagulation.

Woven cloth, knitted cloth, unwoven cloth, these cloths treated with plastics resins and sheets impregnated with polymer solution are used as the porous base plates.

In tearing of the polymer layer into two layers, one can tear the polymer layer by pulling by hand but there are many weak points in this method, for example, uneven napped surface is obtained, only small piece of the sheet can be produced and others. Therefore, it is desired to tear continuously by pulling the recipients to the opposite direction by rotation of roller.

This invention is illustrated by showing some examples of embodiments of practicing this invention. In the examples, all percent and parts are based on weight.

EXAMPLE 1

One part of stearyl alcohol and two parts of carbon black treated by metal soap were added into 100 parts of 15 percent solution in dimethyl formamide of polyurethan elastomer which is made from polyethylenepropylene adipate (molar ratio of ethylene to propylene is 9:1) having two hydroxyl groups at the both ends of molecule and a mean molecular weight of 2,000, pp'-diphenylmethane diisocyanate and ethylene glycol (molar ratios of these constituents =1:5:4), and were dissolved and dispersed well. This viscosity of the polymer solution was 20 poises.

The polymer solution was spread with a thickness of 0.8 mm. on a base material which was obtained by impregnating a nonwoven cloth of nylon fiber with a solution of polyurethan elastomer and coagulating by wet method. It was coagulated by treating with 80 percent aqueous solution of dimethyl formamide at a temperature of 30 ± 1° C. for 15 minutes. Then, it was washed with hot water at 70° C. for 30 minutes to coagulate completely and to remove almost all of dimethyl formamide from the inner part of the layer and then it was dried by hot air at 80° C. The thickness of the polymer layer of the sheet thus obtained was 0.4 mm. One can observe the spongy spaces whose shapes are somewhat dropwise and columnar and which are oriented to vertical direction by viewing the vertical cross section of the polymer layer through a magnifying lens having a low magnification.

The same base material as the base material described above was adhered to the surface of the polymer layer with polyurethan type binding agent at a high temperature. Tearing in two at the center of the polymer layer by pulling both base materials to the opposite direction, one can obtain two sheets having napped surface. The surface turnoff was softly napped. These sheets have the similar appearance and feeling to those of the back side of skin and they may be used for shoe upper, handbags and upholstery.

EXAMPLE 2

One hundred fifty parts of polyethylenepropylene adipate (molar ratio of ethylene to propylene =9:1) having two hydroxyl groups at the both ends of molecule and a mean molecular weight of 1,500, and 50 parts of pp'-diphenylmethane diisocyanate were reacted each other at 140° C. The prepolymer thus obtained was dissolved into 400 parts of dimethyl formamide. To this solution of prepolymer a solution which was obtained by dissolving 12 parts of pp'-diamino diphenylmethane into 200 parts of dimethyl formamide was added at 0° C. to chain-extend the prepolymer and polyurethan elastomer was obtained. The viscosity of the polymer solution composed of 15 percent of polyurethan elastomer, 8 percent of polyvinylchloride, 8 percent of crystalline cellulose, 1 percent of toluene and 8 percent of dimethyl formamide, was adjusted to 60 poises.

Nylon woven cloth of 65 g./m.² was impregnated with the polymer solution described above and was coated on one side of the surface with the polymer solution in a thickness of 0.6 mm. It was coagulated by immersing it into 40 percent aqueous solution of dimethyl formamide adjusted the temperature within 80±1° C. for 15 minutes. Then, it was washed with hot water at 70° C. for one hour and dried by hot air at 80° C. In the polymer coated layer of this sheet, there was a layer of rich spongy spaces whose long diameter was of an order from 30 to 80 microns. A knitted cloth was adhered to the polymer layer by superimposing the knitted cloth, to the surface of which a bonding agent was applied, on the surface of the polymer layer and by pressing them. By tearing the sheet obtained in two, a sheet which had a napped polymer layer on the surface of the base material made from woven nylon cloth and polymer and had a considerably stiff texture and a sheet which had a napped polymer layer on knitted cloth and was flexible, were produced simultaneously. The former can be applied to the materials of upholstery and the latter can be used for clothes.

EXAMPLE 3

One hundred parts of 15 percent solution in dimethyl formamide of polyurethan elastomer described in example 1, one part of stearyl alcohol and two parts of carbon black treated by metal soap were mixed, dissolved and dispersed. The viscosity of the polymer solution was 20 poises.

The polymer solution was extruded into 30 percent aqueous solution of dimethyl formamide to coagulate it through a slit at a temperature of 30° C., and then it was washed with hot water at 70° C. for 20 minutes to coagulate completely and to remove almost all of dimethyl formamide from the inner part of the polymer layer and dried by hot air at 80° C. The thickness of the polymer layer thus obtained was 0.4 mm. One can observe the spongy spaces whose shapes are dropwise and columnar and which are oriented irregularly to vertical direction by viewing the vertical cross section of the polymer layer through a magnifying lens having a low magnification.

A fibrous base material, which was obtained by impregnating a nonwoven cloth consisting of nylon fiber with a solution of polyurethan elastomer and coagulating the solution by wet method, was applied on both sides of the polymer layer by using a bonding agent. After adhering well, one could obtain two sheets with napped surface by pulling the baseplates to the opposite direction to tear in two at the center of the polymer layer. The surface torn off had a softly napped surface. The appearance and feeling of the sheet was similar to those of the back side of the skin and it may be used for shoe upper, handbag and upholstery.

EXAMPLE 4

The viscosity of the polymer solution composed of 15 percent of polyurethan elastomer used in example 2, 8 percent of polyvinyl chloride, 8 percent of crystalline cellulose, 1 percent of toluene and 78 percent of dimethyl formamide was adjusted to 60 poises.

The polymer solution described above was spread on a glass plate in 0.6 mm. thickness and immersed in a 40 percent aqueous solution of dimethyl formamide to coagulate it at 80° C. for 20 minutes, and washed with hot water at 70° C. for one hour and dried by hot air at 80° C. In the polymer layer thus obtained, there was a layer of rich spongy spaces whose long diameters were of an order from 30 to 80 microns.

Knitted cloths were applied on both sides of the polymer layer with a bonding agent and adhered well. Thus, two suede sheet materials were obtained by pulling both knitted cloths to tear in two at the center of the polymer layer.

EXAMPLE 5

One hundred parts of 15 percent solution in dimethyl formamide of the polyurethan elastomer which is a reaction product of polyethylenepropylene adipate (molar ratio of ethylene to propylene=9:1) having hydroxyl radicals in both ends of the molecule and a means molecular weight of 2,000, pp'-diphenyl methane diisocyanate and ethylene glycol (molar ratio of these constituents=1:5:4) were added to one part of stearyl alcohol and two parts of carbon black treated with metal soap and stearyl alcohol and carbon black were dissolved and dispersed in the solution thoroughly. The viscosity of the polymer solution was 20 poises.

The polymer solution was spread in a thickness of 0.8 mm. on a fibrous base material which was obtained by impregnating nonwoven cloth made from nylon fiber with a solution of polyurethan elastomer and coagulating the solution by wet method and the same fibrous base material was applied on the polymer layer by a bonding agent. The polymer solution was coagulated by immersing into 80 percent aqueous solution of dimethyl formamide at a temperature adjusted within 30±1° C. for 30 minutes and then washed with hot water at 70° C. for 60 minutes to coagulate completely and to remove dimethyl formamide from the inner part of the polymer layer and was dried by hot air at 80° C. The thickness of the polymer layer between base materials was 0.4 mm. One can observe the spongy spaces whose shapes are dropwise and columnar and which are oriented irregularly to vertical direction by viewing the vertical cross section of the polymer layer through a magnifying lens having a low magnification.

Two sheets with napped surface could be obtained by pulling the base materials thus obtained to the opposite direction to tear in two at the center of the polymer layer. The surface tornoff was softly napped. The appearance and feeling of the sheet were similar to those of the back side of skin and the products may be used for shoe uppers, handbags and upholsteries.

EXAMPLE 6

One hundred fifty parts of polyethylenepropylene adipate (molar ratio of ethylene to propylene=9:1) having hydroxyl groups at the both ends of the molecule and a mean molecular weight of 1,500, were reacted with 50 parts of pp'-diphenylmethane diisocyanate at 140° C., and the prepolymer thus produced was dissolved into 400 parts of dimethyl formamide. To the solution was added a solution of 12 parts of pp'-diaminodiphenylmethane in 200 parts of dimethylformamide at 0° C. to effect chain extending, whereby polyurethan elastomer was obtained. The viscosity of the polymer solution composed of 15 percent of this polyurethan elastomer, 8 percent of polyvinyl chloride, 8 percent of crystalline cellulose, 1 percent of toluene and 8 percent of dimethyl formamide was adjusted to 60 poises. Woven nylon of 65 g./m.² was impregnated with the polymer solution described above and the polymer solution was spread in a thickness of 0.6 mm. on one side of the surface. Further, a knitted cloth was superimposed on the polymer solution, and then the solution was coagulated by immersing it into 40 percent aqueous solution of dimethyl formamide at a temperature adjusted within 80±0.1° C. for 20 minutes. After washing with hot water at 70° C. for one hour, it was dried by hot air at 80° C. In the polymer layer of this sheet, there was a layer of rich spongy spaces whose long diameters were in an order from 30 to 80 microns.

The nylon cloth and the knitted cloth of the obtained sheet material were pulled to the opposite direction to obtain a sheet which had a napped polymer layer on the surface of the base material which consists of woven nylon cloth and polymer and had a considerably stiff texture, and a sheet which had a napped polymer layer on knitted cloth and was flexible simultaneously. The former can be used for upholstery and the latter can be used for clothes.

EXAMPLE 7

The polyurethan elastomer which is a reaction product of polyethylenepropylene adipate (molar ratio of ethylene to propylene=9:C1) having two hydroxyl groups in each ends of molecule and a mean molecular weight of 2,000, pp'-diphenylmethane diisocyanate and ethylene glycol (molar ratio of these constituent=1:5:4) was used as the polymer.

The viscosity of the polymer solution composed of 20 percent of polyurethan elastomer, 4 percent of powder of crystalline cellulose, 2 percent of water, 20 percent of dimethyl sulfoxide and 54 percent of dimethyl formamide, was adjusted to 140 poises.

The polymer solution was extruded into a hot water at 40° C. through a slit. The clearance of the slit was 0.25 mm. and the amount of extrusion was 1,200 g./m.² in liquid state. After coagulation in hot water at 40° C. for 15 minutes, it was immersed into water at 20° C. to coagulate completely for 15 minutes, and then it was washed with hot water at 70° C. for 30 minutes to remove dimethyl formamide and dimethyl sulphoxide and finally it was dried by hot air at 80°C.

The sheet material was 282 g./m.² in weight, 0.76 mm. in thickness and 0.37 in specific gravity. Observing the cross section of the sheet material, one can find out a layer of rich spongy layer along a straight line of the center of the layer. At the layer one can easily tear off to produce two sheets of the product simultaneously. The surface of the product was napped and was similar to that of the back side of skin. When the sheet is dyed and adhered to a plywood, an excellent material which can be used to the materials of architecture and furniture.

EXAMPLE 8

The viscosity of the polymer solution composed of 12 percent polyurethan elastomer described in example 6, 6 percent of polyvinyl chloride, 1 percent of stearyl alcohol, 1 percent of carbon black treated with metal soap and the polymer solution described above, was adjusted to the 80 poises.

Base material was produced by impregnating unwoven fibrous mat punched by needle with a polymer solution which contains polyurethan elastomer as the main constituent, and coagulating the solution in a wet process. The base material thus obtained was immersed into 50 percent aqueous solution of dimethyl formamide to saturate in it. The aqueous solution on the surface was removed by absorption at 35° C. And the layer of the said polymer solution of 0.9 mm. thickness was spread immediately on it and left for 2 minutes. Meanwhile, the layer of the polymer solution applied to the base material was gradually coagulated from the surface contacted with the base material. Then, it was coagulated by immersing into 30 percent of aqueous solution of dimethyl formamide adjusted a temperature to 35° C.

After coagulation, it was washed with hot water at 70° C. for 30 minutes and was dried by hot air at 80° C. The thickness of the polymer layer of the sheet materials thus obtained was 0.6∼0.7 mm. The layer of rich spongy spaces was formed at the position in a little close to the baseplate from the center of the layer. Tearing off the polymer layer at the layer of rich spongy spaces, one could obtain two sheets of sheet material whose surfaces were homogeneously napped. The sheet of close side to the baseplate was similar to that back side of skin in the appearance, touch and feeling. This material may be used for shoe upper, handbag and upholstery and furniture. The sheet which is composed of only the polymer layer and is not provided with a baseplate may be used for the materials of architecture, upholstery and furniture by adhering to other baseplates.

What we claim is:

1. A method for manufacturing suedelike sheet material which comprises
   coagulating a layer of polymer solution wherein the polymer is selected from the group consisting of polyurethanes and a blend of polyurethane and polymers capable of being dissolved by polyurethane solvents
   by treating with a coagulating bath to form a polymer layer containing relatively large spongy spaces inside
   sticking and adhering well to both sides of said coagulated polymer layer with porous base material, and
   tearing the polymer layer in two at the center.

2. The method of claim 1, wherein said polymer capable of being dissolved by polyurethane solvents is selected from the group consisting of vinyl polymers, polyamides, polyesteramides, polyesters, polybutadiene, and butadiene-acrylonitrile polymers.

3. The method of claim 1, in which the polymer layer having a web of porous material bonded to each side thereof is prepared by forming a layer of said polymer solution on a porous layer web, coagulating said solution and then binding another porous base material to the free surface of said polymer layer.

4. The method of claim 1 in which said porous base material is a woven, unwoven or knitted fabric.

5. The method of claim 3, wherein said porous base material is impregnated with a plastic material.

6. The process of claim 1 wherein said polyurethane is a polyurethane elastomer.

7. The method of claim 1, wherein the coagulating bath comprises a mixture of a solvent and nonsolvent for said polymer.

8. The method of claim 7, wherein the solvent in the coagulating bath is less than 50 percent by weight of said bath.

9. The process of claim 7, wherein said coagulating bath solvent is selected from the group consisting of dimethylformamide, dimethyl acetamide, dimethyl sulphoxide, tetrahydrofuran, dioxane, gamma-butyrolactone or a mixture thereof.

10. The process according to claim 7, wherein said nonsolvent in said bath is selected from the group consisting of water, alcohol, ethyl acetate, benzene and toluene.

11. A method for manufacturing suedelike sheet material which comprises applying a layer of polymer solution wherein the polymer is selected from the group consisting of polyurethane and a blend of polyurethane and polymers capable of being dissolved by polyurethane solvents to a surface of a porous base material, superimposing another porous base material on the layer of polymer solution, coagulating same by treating with a coagulating bath to form a polymer layer containing relatively large spongy spaces inside, drying same, and tearing the polymer layer in two at the center by pulling said base materials.